Sept. 24, 1946. P. ORR 2,408,336
TRANSMISSION
Filed Jan. 8, 1943
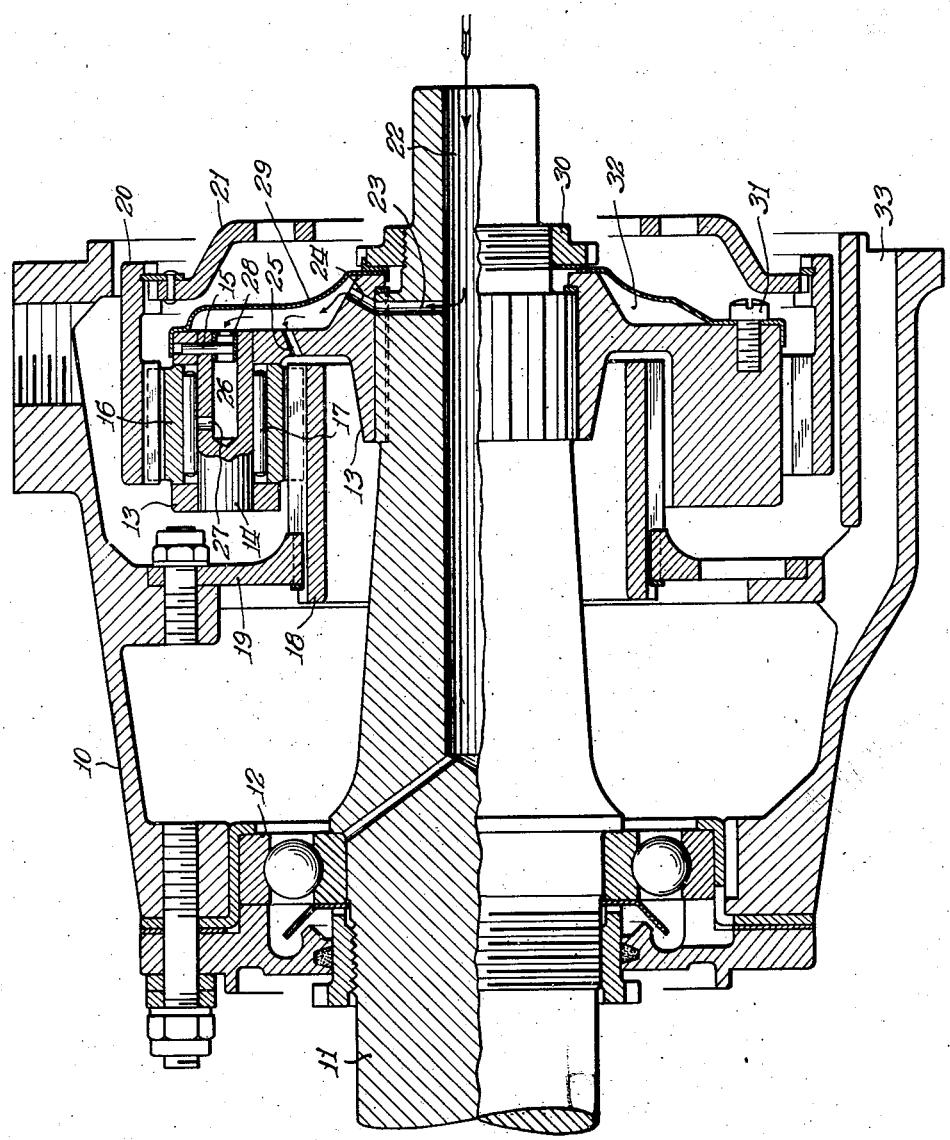
Inventor:
Palmer Orr
By:
Edward C. Fitzhugh
Atty.

Patented Sept. 24, 1946

2,408,336

UNITED STATES PATENT OFFICE 2,408,336

TRANSMISSION

Palmer Orr, Muncie, Ind., assignor to Borg-Warner Corporation, Chicago, Ill., a corporation of Illinois Application January 8, 1943, Serial No. 471,666

5 Claims. (Cl. 184—6)

My invention relates to transmission suitable for use between the propeller and engine of an aeroplane, and more particularly my invention relates to lubricating systems for such transmissions.

Transmissions of the planetary type have been proposed for use between the engine and propeller of aeroplanes. One such transmission comprises a ring gear, a sun gear, planet gears in mesh with the ring and sun gears and a carrier for the planet gears, and the transmission is commonly connected with its ring gear driven by the engine crank shaft, with the carrier connected to drive the propeller, and with the sun gear of the transmission held stationary.

It is an object of my invention to provide, in a transmission of this type, an improved system for lubricating the teeth of the gears and also the bearings between the planet gears and the carrier for the planet gears.

More particularly it is an object of my invention to provide such an improved lubricating system comprising an annular pressure chamber which is in communication with a source of lubricant and with the bearings of the planet gears on the planet gear carrier and which rotates with the gear carrier whereby lubricant is forced into the bearings due to centrifugal force acting on the lubricant in the pressure chamber. It is another object to provide means for forcing the lubricant into the pressure chamber whereby the bearings for the planet gears are lubricated by lubricant under pressure due to centrifugal force and also to the said means.

It is another object to so construct the transmission that the annular pressure chamber is formed by the planet gear carrier and an annular member fixed with respect to the carrier. It is contemplated that the annular member shall preferably be of sheet material in order to add little to the weight of the transmission.

It is still another object to provide a passage in the planet gear carrier in communication with the pressure chamber for directing a stream of lubricant on the meshing teeth of each of the planet gears and one of the gears in mesh with the planet gears.

It is a further object to provide a passage between the lubricant pressure chamber and each of the bearings for the planet gears which has a perforated member therein, with the perforation being smaller than the cross-sectional area of the passage for limiting the flow of lubricant into the passage.

The invention consists of the novel constructions, arrangements and devices to be hereinafter described and claimed for carrying out the above stated objects and such other objects as will appear from the following description of a certain preferred embodiment illustrated in the accompanying drawing.

Referring now to the drawing, the illustrated transmission comprises a housing 10 in which is journaled a shaft 11 by means of a bearing 12. The shaft 11 is adapted to have fixed thereon, to the left of the bearing 12, as seen in the drawing, an aeroplane propeller (not shown), and the shaft has splined thereon a carrier or support member 13 in which is disposed a plurality of shafts 14 (one being shown in the drawing). A pin 15 is provided for fixing each of the shafts 14 with respect to the member 13. A planet gear 16 is rotatably disposed on each of the shafts 14 by means of rollers 17. A sun gear 18 is provided coaxially disposed with respect to the shaft 11 and in mesh with the planet gears 16. The gear 18 is splined in an annular member 19 which is bolted to the housing 10 and which thus holds the sun gear 18 stationary and in position. A ring gear 20 is in mesh with the planet pinions 16 and is splined on a member 21 which is adapted to be connected to and carried by the crank shaft of an aeroplane engine (not shown). It will be understood that the crank shaft functions to hold the member 21 and the ring gear 20 in their position relative to the planet gears 16 as shown in the drawing.

The shaft 11, which is adapted to carry an aeroplane propeller, functions to drive the propeller at a slower speed than the member 21 and ring gear 20 are driven, as by the crank shaft of an aeroplane engine. The ring gear 20 rotates while the sun gear 18 is stationary, and the planet gears 16 are thus caused to rotate about the sun gear 18, and they drive the carrier member 13 and thereby the shaft 11 at some speed slower than that of the ring member 20.

The lubricating system for the transmission comprises a central passage 22 extending into the shaft 11 from the end of the shaft which is adapted to be adjacent the engine for driving the transmission and radially extending passages 23 (one being shown in the drawing) in the shaft. The carrier member 13 is formed with a plurality of passages 24 (one being shown in the drawing) each of which is in communication with one of the passages 23 in the shaft 11. The carrier member 13 is formed with other passages 25 (one being shown in the drawing) each of which is disposed so as to direct fluid passing therethrough from the right side of the carrier, as shown in the figure, on to the meshed teeth of one of the planet gears 16 and the sun gear 18. Each of the shafts 14 is provided with a central passage 26 therein extending into the shaft from the right end of the shaft, as seen in the figure, and each shaft is also provided with a passage 27 which is in communication with the passage 26 and is disposed to direct any fluid passing through the passage 27 from the passage 26 on to the rollers 17. The passage 26 in each of the shafts 14 is preferably provided with a perforated cup 28 in its open end for forming a constricted opening for the passage.

A stamped annular sheet metal plate member 29 is provided on the right side of the carrier member 13 as seen in the figure, and the plate member 29 is fixed with respect to the carrier member 13 by means of a threaded collar 30 on shaft 11 and screws 31 in the carrier member. The plate member 29 functions with the carrier member 13 to provide an annular, fluid-tight container or reservoir 32 at the right side of the carrier member 13 which reservoir is in communication with the passages 24 and 25 in the carrier member and with the passages 26 in the shafts 14.

The passage 22 is connected with a lubricant source (not shown), and when the gear carrier 13 is rotating, lubricant flows from the passage 22, through the passages 23 and 24 and into the reservoir 32 on the right side of the planet carrier 13. The oil flows from the fluid container through the oil cups 28 and into the passages 26 and 27 in the shafts 14 and on to the rollers 17, and the rollers are thereby lubricated. Oil also flows from the reservoir 32 through the passages 25 in the carrier 13 and is directed thereby on to the meshed teeth of each of the planet gears 16 and the sun gear 18. The meshed teeth of the planet gears 16 and the ring gear 20 are lubricated by means of oil which has passed from the passages 25 on to the teeth of the planet gears and which is carried on the teeth of the latter gears as they rotate. This flow of lubricant to the rollers 17 and gear teeth is due to the centrifugal force on the lubricant in the reservoir 32 caused by the rotation of the reservoir. The reservoir thus acts as a lubricant pressure chamber and as a pump for lubricating the parts of the transmission. Although the reservoir 32 acts as a pump, in order to obtain a greater flow of lubricant, the lubricant is preferably forced into the passage 22 by means of a pump (not shown) driven by the aeroplane engine. The lubricant flowing through the passages 25 and 26 to lubricate the meshed teeth of the gears 16 and 18 and the rollers 17 respectively is drained from the housing 10 to any suitable sump (not shown) by means of a channel 33 provided in the housing.

The perforated caps 28 function to effectively decrease the cross-sectional size of the lubricant conduits between the reservoir 32 and rollers 17, including the passages 26 and 27, to the size of the perforations in the caps. The larger passages 26 are preferably provided instead of ones the size of the openings in the caps 28, as it is easier to drill the passages of larger diameter, and the carrier 13 is thereby made lighter in weight. The openings in the caps 28 and the openings 25 are of such relative cross-sectional sizes that both the rollers 17 and the meshed teeth of the gears 16 and 18 are effectively lubricated, with the meshed teeth being lubricated by a stream of lubricant passing through the openings 25 and forcibly impinging on the meshed teeth. The total effective cross-sectional area of the outlets of the reservoir 32 is less than the total cross-sectional area of the inlets of the reservoir; that is to say, the sum of the cross-sectional areas of the passages 25 plus the sum of the effective cross-sectional areas of the conduits to the rollers 17 from the reservoir is less than the sum of the cross-sectional areas of the passage 24, and lubricant under pressure is thus always maintained in the reservoir 32 when the transmission is in operation.

The planetary gearing of the illustrated transmission is well lubricated by means of the lubrication system shown and described. The provision of the system advantageously adds little to the cost of the transmission as a whole and adds little to the weight of the transmission.

I do not intend to limit the invention to the details shown and described, except only insofar as certain of the appended claims are specifically so limited, as it will be obvious that modifications may be made without departing from the principles of the invention.

I claim:

1. In power transmission mechanism, the combination of a hollow rotatable shaft; a plurality of power transmitting elements; a support on said shaft for rotatably mounting said elements about the axis of said shaft; a source of lubricant under pressure discharging into said shaft; an annular pressure chamber sealed wholly upon and rotatable with said support; inlet conduits for said chamber communicating with said shaft; and discharge conduits connecting said chamber to said power transmitting elements, the sum of the effective cross-sectional areas of the inlet conduits exceeding the sum of the effective cross-sectional areas of the discharge conduits, whereby lubricant under pressure is maintained in said chamber at all times.

2. In power transmission mechanism, a hollow rotatable shaft; a support having a hub porton and a peripheral portion joined thereto; a plurality of power transmitting members rotatably mounted on said support and arranged radially around the axis of said support and hub; an annular member assembled with the hub and peripheral portions of said support and having an intermediate portion in spaced relation to said support, said annular member being constructed and arranged to constitute with said support a fluid pressure chamber upon the side of said support opposite said power transmitting members; and a source of lubricant under pressure communicating with said shaft, said hub and shaft being formed with passageways therein communicating with the hollow portion of said shaft and said pressure chamber, and said support being formed with passageways therein adjacent said power transmitting members for transmitting lubricant from said pressure chamber to said power transmitting members.

3. In power transmission mechanism, a hollow rotatable shaft; a support having a hub portion and a peripheral portion jointed thereto; a plurality of power transmitting members rotatably mounted on said support and arranged radially around the axis of said support and hub; an annular member assembled with the hub and peripheral portions of said support and having an intermediate portion in spaced relation to said support, the inner and outer margins of said annular member having fluid tight relationship with respect to said hub and the periphery of said support to provide a sealed pressure chamber carried by said support; and a source of lubricant under pressure communicating with said shaft, said hub and shaft being formed with passageways therein communicating with the hollow portion of said shaft and said pressure chamber, and said support being formed with passageways therein adjacent said power transmitting members for transmitting lubricant from said pressure chamber to said power transmitting members.

4. In a power transmission mechanism, the combination of a plurality of gears, a support for said gears for mounting them for rotation about a central axis, each of said gears also being rotatable about its own bearing, which bearings are carried by said support, a gear in mesh with said first-named gears, a source of lubricant, an annular member secured to said support to form therewith a fluid-tight lubricant chamber, said chamber being in communication with the source of lubricant, passageways through said support and communicating with said chamber for directing lubricant upon the meshed gears, and other passageways in said support for connecting said chamber and said bearings.

5. In a power transmission mechanism, the combination of a plurality of gears, a support for said gears for mounting them for rotation about a central axis, each of said gears also being rotatable about its own bearings, which bearings are carried by said support, a gear in mesh with said first-named gears, a source of lubricant under pressure, an annular member secured to said support to form therewith a fluid-tight lubricant chamber, said support being provided with outlet passageways for connecting the chamber with said bearings and with inlet passageways for connecting the chamber with said lubricant source, said support being also provided with outlet passageways in communication with said chamber for directing lubricant on the meshed teeth of said first and said second-named gears, the sum of the effective cross-sectional areas of said inlet passageways being greater than the sum of the effective cross-sectional areas of said outlet passageways whereby lubricant under pressure is maintained in said chamber at all times.

PALMER ORR.